Feb. 11, 1930.  G. O. MORFORD  1,746,359
MATERIAL HANDLING PLANT
Filed Feb. 4, 1928
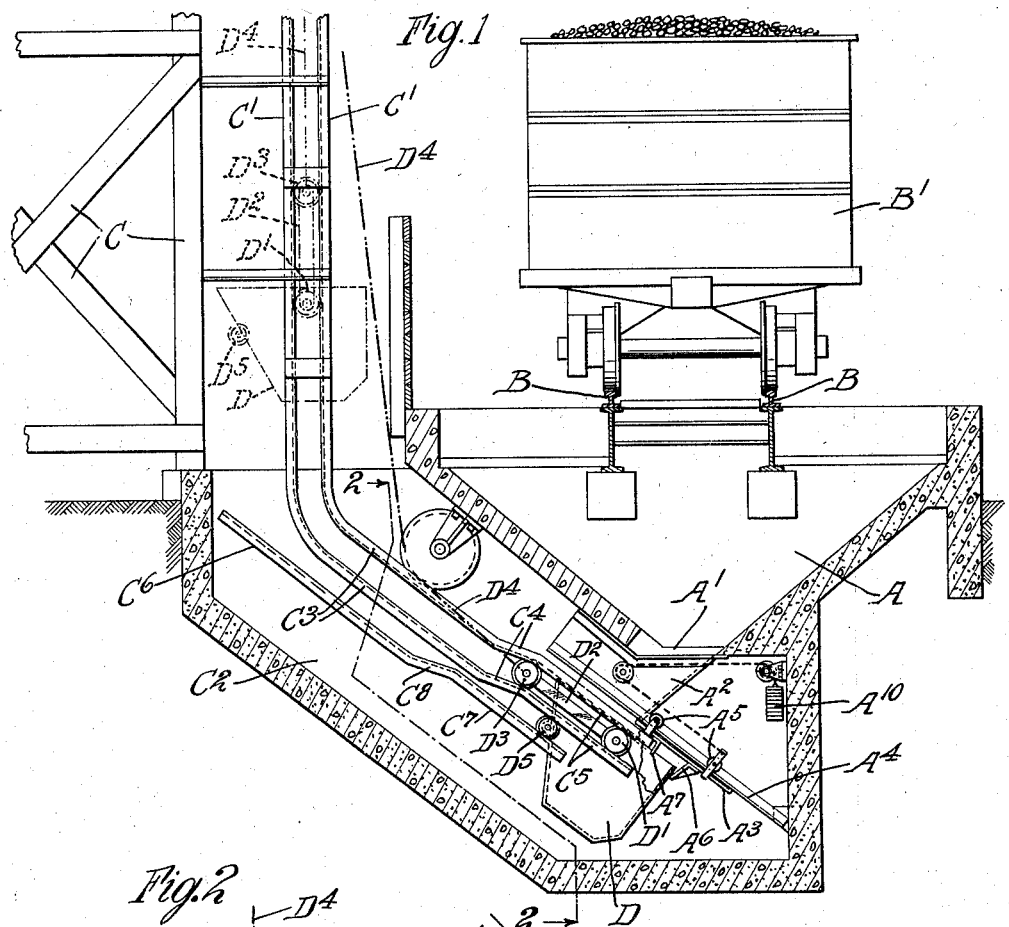
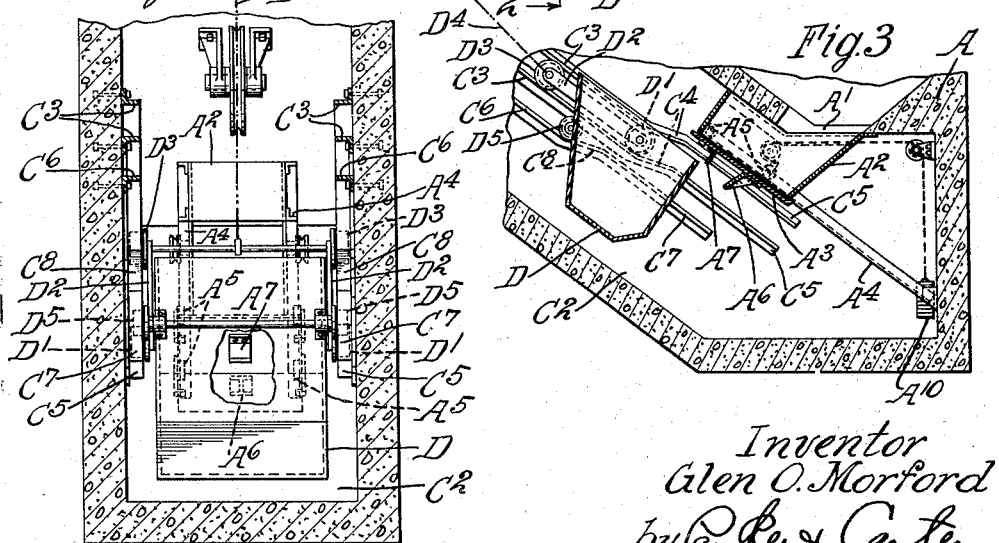
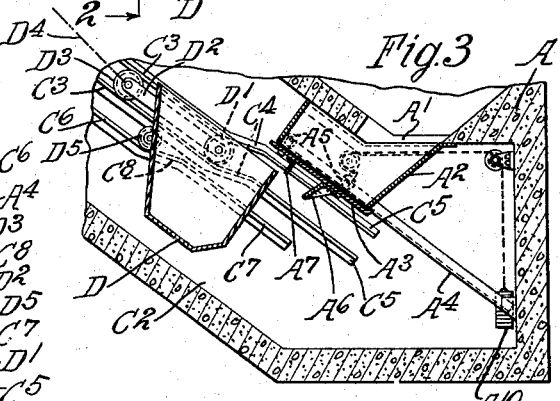
Inventor
Glen O. Morford
by Parker & Carter
Attorneys.

Patented Feb. 11, 1930

1,746,359

UNITED STATES PATENT OFFICE

GLEN O. MORFORD, OF BERWYN, ILLINOIS, ASSIGNOR TO ROBERTS & SCHAEFER COMPANY, OF CHICAGO, ILLINOIS, A CORPORATION OF ILLINOIS

MATERIAL-HANDLING PLANT

Application filed February 4, 1928. Serial No. 251,788.

My invention has relation to a skip hoist or coaling plant and has for one purpose to provide a plant to which material, for example coal, may be received from track level and may be transported for storage or delivery to a point or zone above track level. One object is the provision of a plant of the type described which shall be compact and easily operated and which shall involve a minimum of construction. Other objects will appear from time to time in the course of the specification and claims.

I illustrate my invention more or less diagrammatically in the accompanying drawings, wherein—

Figure 1 is a transverse vertical section;

Figure 2 is an enlarged section along the line 2—2 of Figure 1; and

Figure 3 is a transverse vertical section similar to Figure 1 showing parts in different positions.

Like parts are indicated by like symbols throughout the specification and drawings.

A indicates a receiving hopper having a discharge port or outlet $A^1$ with which is associated for example a steel chute $A^2$ adapted to be closed by the automatic loader or closure gate $A^3$. The gate $A^3$ moves along tracks $A^4$ for example by means of the rollers $A^5$ and is provided with a stop $A^6$ of maximum height and an additional adjacent stop $A^7$ of minimum height, the stop of greater length, $A^6$ being in advance of the stop $A^7$.

B B indicate storage tracks above the hopper on which may be spotted a car $B^1$ from which the material to be handled may be discharged. It will be realized that I do not wish to limit myself to the use of any particular conveying means for delivering material to the hopper and of course any desired material may be handled.

C generally indicates a tower or elevating structure preferably adjacent the hopper. Positioned upon it are vertically extending pairs of guide tracks $C^1$. Whereas they are shown as vertical it is obvious that the invention may be practiced with tracks inclined from the vertical. $C^2$ generally indicates a pit beneath the hopper, herein shown as underlying one side of the hopper and its discharge port.

The chute $A^2$ projects downwardly and laterally from the hopper bottom into the pit $C^2$. Vertical tracks $C^1$ are shown as inclined laterally beneath the hopper as at $C^3$. Adjacent the chute $A^2$ they are laterally inclined as at $C^4$ to connect with the terminal extension $C^5$ parallel with the tracks $C^3$ but closer to the face of the chute $A^2$ and to the gate $A^3$. It will be understood that the track sections $C^3$ and $C^5$ are preferably parallel with the plane of movement of the gate $A^3$ along the tracks $A^4$. $C^6$ is an additional guide track, generally parallel with the section $C^3$. It includes an extension $C^7$ parallel with the extension $C^5$ of the tracks $C^3$, the extension being connected with the track $C^6$ for example by the inclined portion $C^8$.

D indicates a bucket adapted to travel along the tracks above described. Positioned upon it, above its center of gravity is any suitable track engaging member or roller $D^1$, one at each side of the bucket. Pivoted to the bucket concentrically with the members $D^1$ is the bail $D^2$ having at its outer end a pair of track engaging rollers $D^3$. $D^4$ indicates any suitable cable system whereby the bucket is raised and lowered along the tracks, the power source forming no part of the present invention and not benig herein indicated. When traveling along the tracks $C^1$ it will be understood that the location of the guide members $D^1$ is such that the bucket or the upper edge of the bucket is maintained in a generally horizontal plane. Positioned upon the bucket at a point relatively distant from the guide members $D^1$ is an additional track engaging member $D^5$ adapted to be opposed to the supplemental track system $C^6$ $C^7$ $C^8$.

It will be seen that the bucket is a free swinging bucket movable about the pivots that unite it with the bail, and that when moving along its vertical course its upper edge is approximately horizontal, as stated, being maintained in this position because its said pivots are located well above the center of gravity of the bucket and its load. This arrangement makes it quite unnecessary to extend the supplemental track system $C^6$, $C^7$, $C^8$, that operates to effect a tilting of the bucket, beyond the pit C².

It will be understood that any suitable storage or material delivery means may be associated with the tower structure C and any suitable means may be employed for tilting the bucket D for discharge. Since such means do not of themselves form part of the present invention they are not herein illustrated.

It will be realized that whereas I have described and shown a practical and operative device that nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

The material to be handled is deposited in any desired manner in the hopper A and passed through the port A¹, filling the chute A² and engaging the gate A³ when in its normally closed position. Assuming that the bucket D starts in upward position and is lowered downwardly along the track C¹, when the track engaging member D⁵ engages the track C⁶ the bucket, heretofore in horizontal position, is tilted to bring its upper edge into parallelism with the plane of the gate A³ and of its tracks A⁴. The bucket continues its downward movement along the track C³ and, engaging the inclined portion C⁴, is moved laterally toward the gate A³. During its lateral movement the lower edge of the bucket clears the short stop A⁷ on the gate A³ and engages the long stop A⁶. As the bucket continues its downward movement the gate moves, in response to movement of the bucket, and material flows through the chute A² into the bucket, filling it. Upon retrograde movement of the bucket the bucket edge engages the short stop A⁷ and closes the gate. When the gate reaches the closed position the bucket begins its lateral recessive movement along the inclined section C⁴ and is thereby freed from contact with the stop A⁷ and continues its upward movement.

I may provide any suitable means, for example the counterweight A¹⁰, whereby the gate A³ is normally held in closed position.

I claim:

1. In a skip hoist installation, a hopper having a discharge port, a gate to close said port, guideways for directing the movements of the gate, a pit into which the hopper discharges through the port, a pivotally supported bucket, vertical guiding means for the bucket, guiding means for the bucket at the lower end of said vertical guiding means, arranged to direct the bucket into the pit along a path inclined to the vertical and substantially parallel with the path of the movement of the gate, said means being constructed to cause the bucket to be tilted and to maintain it in tilted condition, and to move the bucket bodily toward the gate after being tilted and before finishing its course within the pit.

2. In a loader, a hopper and a discharge port therefor, a gate positioned across said port, a pivotally supported bucket free to swing upon its supports and means for tilting the bucket and causing it to move while tilted beneath said hopper along a path generally parallel with the plane of said gate, and means for moving said bucket, while still tilted, laterally from said path toward said gate, and thereafter along a path generally parallel with said gate but closer thereto than the first mentioned path.

3. In a loader, a hopper and a discharge port therefor, a gate positioned across said port, a pivotally supported bucket free to swing upon its supports and means for tilting the bucket and causing it to move while tilted beneath said hopper along a path generally parallel with the plane of said gate, and means for moving said bucket, while still tilted, laterally from said path toward said gate, and thereafter along a path generally parallel with said gate but closer thereto than the first mentioned path, including a supplemental guide track extending beneath said hopper along a path generally parallel with said gate but laterally removed therefrom and an extension of said track parallel with said gate and lying closer thereto.

4. In a skip hoist installation which includes an elevated structure, a track hopper adjacent said structure, a discharge port in the bottom of said hopper, a gate therefor, a pit to which said discharge port delivers, a pivotally supported bucket operable upon said elevated structure and free to swing upon its pivotal supports, means for guiding said bucket into said pit and into alignment with the discharge port, the gate of said port being movable, in response to movement by said bucket, along a path inclined from the horizontal, a track extending along said elevated structure and beneath said hopper, a track engaging guide member positioned upon said bucket, the bucket being normally in horizontal position as it travels upon said elevated structure, and means for tilting said bucket into parallelism with the plane of said gate, including a supplemental track generally parallel with said first mentioned track and an additional track engaging member, opposed thereto, positioned upon said bucket.

5. In a skip hoist installation, a bucket, a bail pivotally connected thereto on a line above the center of gravity of the bucket, the bucket being free to swing upon its pivotal connection without bail; rollers supported on the axis of the said pivotal connection; a track-engaging member carried by the bucket at a point distant from the rollers; track-engaging rollers carried by the free end of the bail; means connected with the bail through which the bucket is raised and lowered; a track along the path of the bucket with which the rollers located at the pivotal connection of the bucket and those at the free end of the bail engage; this track having a laterally inclined portion arranged to deflect the bucket bodily as it approaches the place of loading; and a supplemental track with which engages the track-engaged member carried by the bucket, the said supplemental track being located adjacent to the place of loading the bucket and arranged to cause the bucket to be tilted upon its pivotal connection with the bail, and also, in combination with the track-engaging rollers at the pivotal connections of the bucket with the bail, to hold the bucket firmly against free swinging motion while in tilted and loading positions.

Signed at Chicago, county of Cook and State of Illinois, this 27th day of January 1928.

GLEN O. MORFORD.